(12) United States Patent
Aso (10) Patent No.: US 11,833,594 B2
(45) Date of Patent: Dec. 5, 2023

(54) CUTTING TOOL

(71) Applicant: TUNGALOY CORPORATION, Fukushima (JP)

(72) Inventor: Takahiro Aso, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/850,486

(22) Filed: Jun. 27, 2022

(65) Prior Publication Data

US 2023/0063846 A1 Mar. 2, 2023

(30) Foreign Application Priority Data

Aug. 30, 2021 (JP) ................................. 2021-140181

(51) Int. Cl.
*B23C 5/28* (2006.01)
*B23C 5/10* (2006.01)

(52) U.S. Cl.
CPC . *B23C 5/10* (2013.01); *B23C 5/28* (2013.01)

(58) Field of Classification Search
CPC B23C 5/28; B23C 5/282; B23C 5/287; B23B 27/10; B23B 27/12; B23B 51/042; B23B 51/06; B23B 51/063; B23B 51/068; B23B 51/0686; B23B 2250/12; B23B 2250/121
See application file for complete search history.

(56) References Cited

U.S. PATENT DOCUMENTS

| | | | | |
|---|---|---|---|---|
| 5,290,135 A | * | 3/1994 | Ball ....................... | B23Q 11/10 407/11 |
| 5,947,653 A | * | 9/1999 | Hamberg ............ | B23B 51/0493 408/230 |
| 8,439,609 B2 | * | 5/2013 | Woodruff ................ | B23C 5/109 407/11 |
| 10,010,948 B1 | * | 7/2018 | Hayden ................... | B23P 15/32 |
| 10,556,278 B2 | * | 2/2020 | Fraese ................... | B23C 5/2208 |
| 2008/0131216 A1 | * | 6/2008 | Sasu ......................... | B23C 5/28 407/113 |
| 2012/0141220 A1 | * | 6/2012 | Chen ....................... | B23B 31/11 409/136 |
| 2015/0063931 A1 | * | 3/2015 | Wu ..................... | B23B 51/0493 408/59 |
| 2021/0101214 A1 | | 4/2021 | Fraese et al. | |

FOREIGN PATENT DOCUMENTS

| | | | | |
|---|---|---|---|---|
| AT | 7296 U1 | * | 1/2005 | ........... B23B 27/145 |
| CN | 105750598 A | * | 7/2016 | ............. B23B 51/00 |
| CN | 109352055 A | * | 2/2019 | ........... B23C 5/2204 |
| CN | 112620672 A | | 4/2021 | |
| DE | 10145006 A1 | * | 4/2003 | ............... B23C 5/08 |

(Continued)

*Primary Examiner* — Nicole N Ramos
(74) *Attorney, Agent, or Firm* — Studebaker & Brackett PC (57) ABSTRACT

A cutting tool includes a grip part and a cutting part. The grip part and the cutting part have a channel for guiding fluid supplied from outside to an outflow port. The channel includes a plurality of first channels that extend at least partially parallel to a rotational center axis, and second channels that extend from the first channels toward cutting edges of cutting inserts. In the cutting tool, the number of first channels is smaller than the number of cutting edges arranged in a circumferential direction.

7 Claims, 10 Drawing Sheets

(56) References Cited

FOREIGN PATENT DOCUMENTS

| | | | | |
|---|---|---|---|---|
| EP | 2554310 | A2 * | 2/2013 | ............. B23C 5/109 |
| EP | 3875196 | A1 * | 9/2021 | |
| GB | 2501511 | A * | 10/2013 | ............. B23B 27/10 |
| JP | H10-175114 | A | 6/1998 | |
| JP | 2010-234457 | A | 10/2010 | |
| JP | 2016-068172 | A | 5/2016 | |
| JP | 2021-030385 | A | 3/2021 | |
| KR | 101014122 | B1 * | 2/2011 | |
| WO | WO-2018010706 | A1 * | 1/2018 | |

* cited by examiner

CUTTING TOOL

BACKGROUND OF THE INVENTION

Field of the Invention

The present invention relates to a cutting tool.

Description of Related Art

A cutting tool used for machining of metals includes a grip part that is a part gripped by a machine tool such as a milling machine and a cutting part that is a part provided with a cutting edge. The machine tool brings the cutting edge of the cutting part into contact with a workpiece such as metal while rotating the entire cutting tool in the state of gripping the grip part, thereby machining the workpiece.

In this case, in general, fluid is supplied to a point, at which the cutting edge and the workpiece contact, (cutting point) or to a vicinity thereof. Such fluid is supplied for the purpose of, for example, discharge of chips, cooling of the cutting tool, cooling of the workpiece, lubrication, and rust-proofing. Note that liquid is used as fluid in many cases, but gas is sometimes used. Fluid is supplied from external nozzles disposed around the cutting tool in some cases, but as disclosed in Patent Publication JP-A-2016-68172, fluid is supplied through a channel formed inside the cutting tool in some cases.

SUMMARY

A plurality of channels (coolant holes) are formed in the interior of the cutting tool (the end mill main body) described in Patent Publication JP-A-2021-30385 so as to extend substantially in a longitudinal direction thereof, and the fluid is supplied toward the cutting edges through the respective channels. The number of channels is equal to the number of cutting edges arranged in a circumferential direction.

In a configuration of this type, when an attempt is made to increase the number of cutting edges arranged along the circumferential direction, it is necessary to form channels extending in the longitudinal direction in the same number as the number of cutting edges. However, the range in which it is possible to form channels in the interior of the cutting tool is limited, and therefore, when the number of channels increases, it becomes difficult to secure a sufficient inner diameter for each of the channels. As a result, channel resistance received by the fluid increases, and it may therefore be impossible to supply the fluid to the cutting edges in a sufficient amount.

An object of the present invention is to provide a cutting tool with which a sufficient amount of fluid can be supplied to a cutting edge.

A cutting tool according to an aspect of the present invention includes a grip part, which is a columnar part to be gripped by a machine tool and which a center axis matches a rotational center axis, a cutting part in which a recessed chip pocket is formed, and a plurality of cutting edges provided to an inner surface of the chip pocket so as to be arranged along a circumferential direction. The grip part and the cutting part have therein a channel for guiding fluid supplied from outside to an outflow port formed in a vicinity of the cutting edge. The channel includes: a plurality of first channels that extend at least partially parallel to the rotational center axis, and second channels that extend from the first channels toward the cutting edges. The number of first channels is smaller than the number of cutting edges arranged along the circumferential direction.

In the cutting tool having the above-mentioned configuration, the number of first channels extending parallel to the rotational center axis is smaller than the number of cutting edges arranged along the circumferential direction, and the fluid is supplied from the first channels to the cutting edges via the second channels. Since there is no need to provide a large number of first channels in accordance with the number of cutting edges arranged along the circumferential direction, a sufficient inner diameter can be secured for the first channels, and as a result, channel resistance can be suppressed such that a sufficient amount of the fluid can be supplied toward the cutting edges.

In a further preferred aspect, the second channel may be provided in plurality, the plurality of second channels being connected to one first channel such that the fluid that has passed through the one first channel is supplied to each of a plurality of cutting edges.

In a further preferred aspect, in the cutting part, a plurality of the cutting edges may be provided respectively at a plurality of stage positions arranged in a direction along the rotational center axis so as to be arranged along the circumferential direction.

In a further preferred aspect, a plurality of the second channel may be provided in plurality, the plurality of second channels being connected to one first channel such that the fluid that has passed through the one first channel is supplied toward each of the cutting edges located at a plurality of the stage positions.

In a further preferred aspect, the channel may further include a third channel that extends along the rotational center axis from an end part of the grip part on an opposite side thereof to the cutting part, and the plurality of first channels may be connected to the third channel.

In a further preferred aspect, an inner diameter of the first channel may be larger than an inner diameter of the second channel, and an inner diameter of the third channel may be larger than the inner diameter of the second channel.

In a further preferred aspect, the cutting edge may be a part of a cutting insert mounted to an inner surface of the chip pocket.

In a further preferred aspect, the outflow port that is an outlet of fluid that has passed through the second channel may be formed in an inner surface of the chip pocket, and a position of the outflow port in a direction along the rotational center axis may be a position overlapping a range where the cutting insert is provided in the same direction.

According to the present invention, a cutting tool with which a sufficient amount of fluid can be supplied to a cutting edge is provided.

DETAILED DESCRIPTION

Embodiments are described below with reference to the accompanying drawings. To facilitate understanding of the description, the same components in the figures are denoted by the same reference numeral whenever possible, and overlapping descriptions are omitted.

Figure 1:
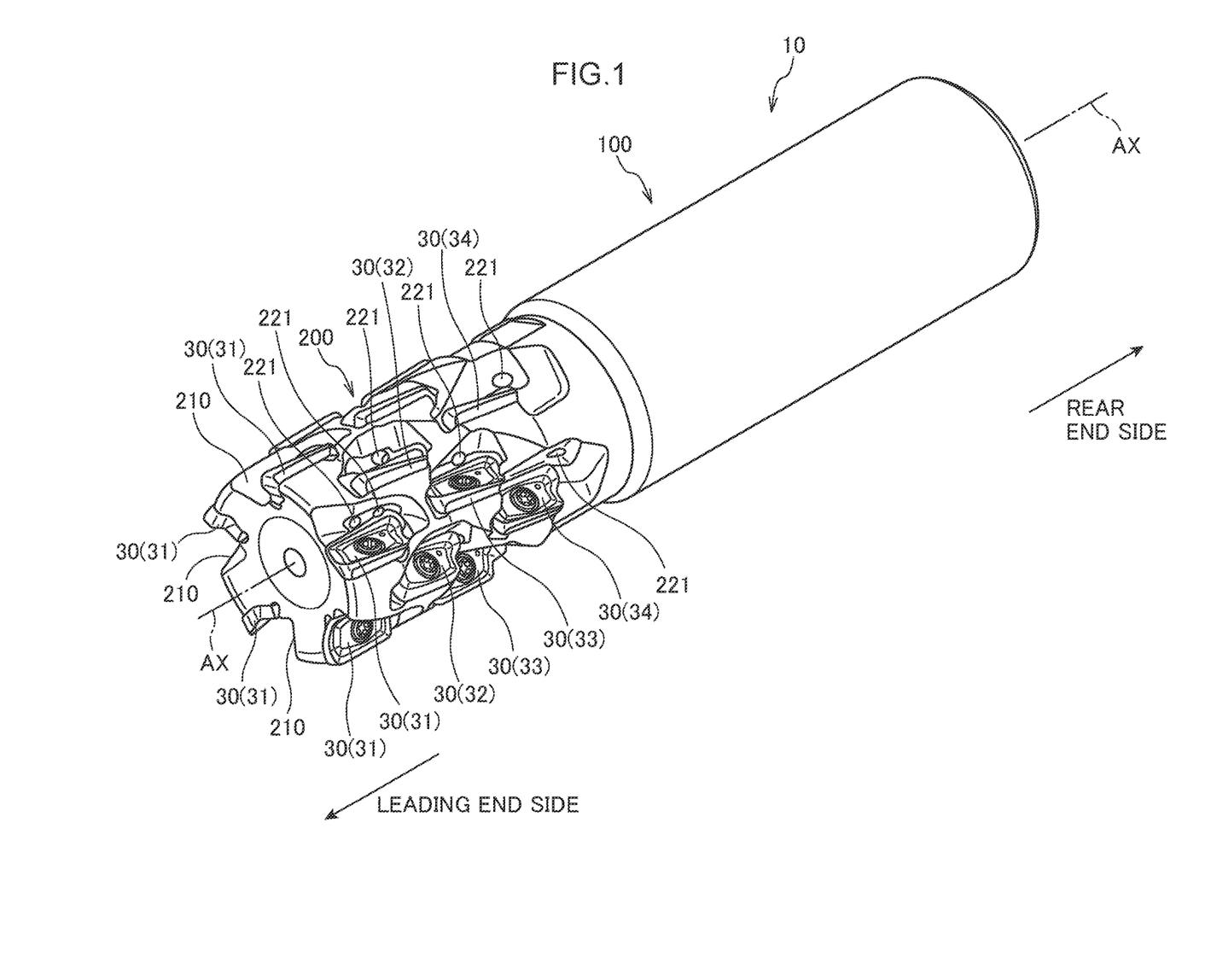
FIG. 1 is a perspective view illustrating a configuration of a cutting tool according to a first embodiment.

A configuration of a cutting tool 10 according to a first embodiment is described. The cutting tool 10 according to this embodiment is used while being mounted to a machine tool (not shown) such as a milling machine, and is configured as an endmill of roughing type. As illustrated in FIG. 1, the cutting tool 10 includes a grip part 100 and a cutting part 200.

The grip part 100 is a part what is called "shank" and is a columnar part to be gripped by a machine tool (not shown). The center axis of the grip part 100 matches a rotational center axis AX of rotation of the cutting tool 10. The grip part 100 is a part on one side (part on right side in FIG. 1) of the cutting tool 10 along the rotational center axis AX. The cutting part 200 described next is a parton the other side (part on left side in FIG. 1) of the cutting tool 10 along the rotational center axis AX. A direction toward the grip part 100 along the rotational center axis AX is hereinafter referred to as "rear end side". A direction toward the cutting part 200 along the rotational center axis AX is hereinafter referred to as "leading end side".

The cutting part 200 is a part on which a plurality of cutting inserts 30 are mounted and is a part for machining a workpiece by the cutting inserts 30. The cutting inserts 30 is a replaceable edge fastened and fixed to the cutting part 200. An edge part formed in the leading end of the cutting insert 30 functions as a "cutting edge" for cutting a workpiece. Note that the edge part serving as a cutting edge of the cutting insert 30 may be a leading end of the cutting insert 30, as in this embodiment, but may be the entire side (that is, range over entire periphery of polygon) of the cutting insert 30. Which part of the cutting insert 30 is used as a cutting edge is not particularly limited.

In the cutting part 200, a recessed chip pocket 210 is formed. The chip pocket 210 is formed as a space for receiving chips generated during cutting and discharging the chips to the outside. In the inner surface of the chip pocket 210, a plurality of recessed insert seats (not shown) are formed so as to be arranged along a circumferential direction, and the cutting insert 30 is fastened and fixed to each insert seat. As a result, the plurality of cutting edges of the cutting inserts 30 are arranged along the circumferential direction.

In the present embodiment, the chip pocket 210 in the number corresponding to the number of cutting inserts 30 are formed. In other words, the plurality of chip pockets 210 are also arranged along the circumferential direction similarly to the cutting inserts 30. However, a chip pocket 210 provided with one cutting insert 30 and a chip pocket 210 provided with another cutting insert 30 may be connected to each other.

Figure 2:
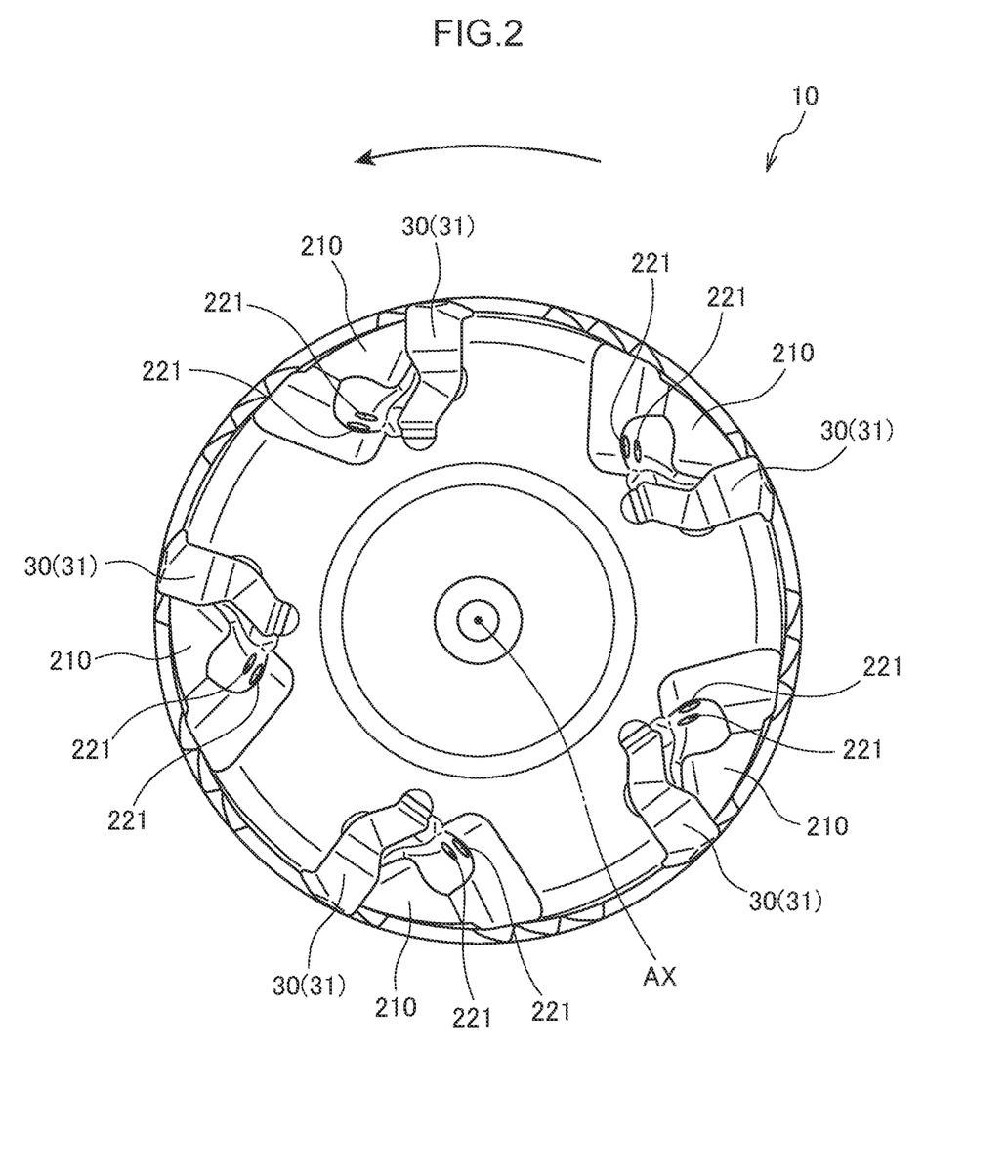
FIG. 2 is a view of the cutting tool according to the first embodiment as seen from a leading end side.

FIG. 2 illustrates the appearance of the cutting part 200 as seen from the leading end side along the rotational center axis AX. As illustrated in FIG. 2, five chip pockets 210 are formed on the leading end side of the cutting part 200 so as to be arranged at equal intervals along the circumferential direction, and the cutting insert 30 is fixed to the inner surfaces of the chip pockets 210. An arrow illustrated in FIG. 2 indicates a rotational direction of the cutting tool 10 when used. The cutting insert 30 is fixed to a surface that is an end part of the inner surface of the chip pocket 210 on the rearmost side in the rotation direction.

Figure 3:
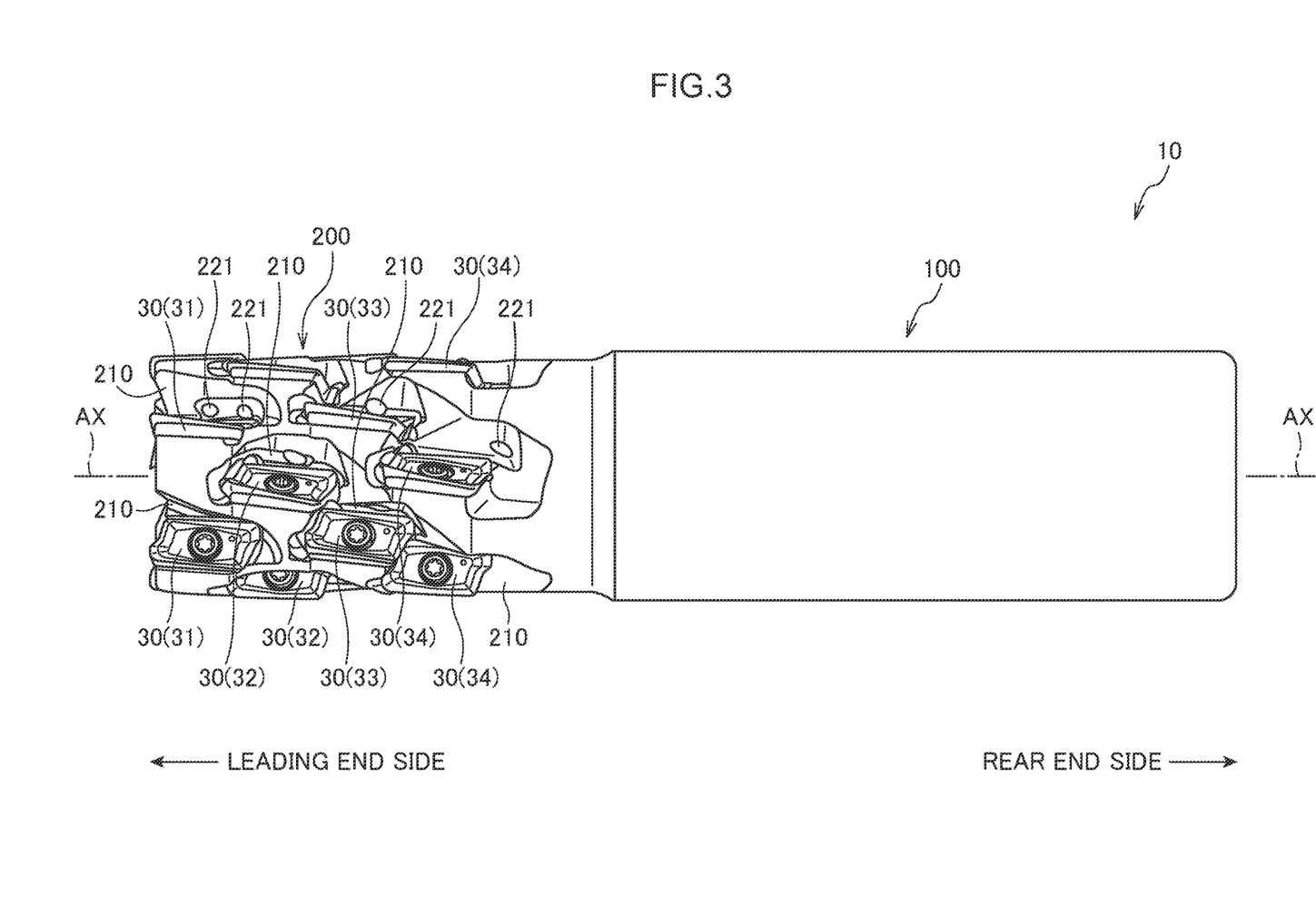
FIG. 3 is a view depicting the cutting tool according to the first embodiment as seen from the side.

A plurality of chip pockets 210 and a plurality of cutting inserts 30 are provided not only on the leading end side of the cutting part 200 but also on the side surface part of the cutting part 200. The specific arrangement thereof is described with reference to FIG. 3. FIG. 3 illustrates the outer appearance of the cutting tool 10 as seen from a direction perpendicular to the rotational center axis AX. As illustrated in FIG. 3, in the cutting part 200, a plurality of chip pockets 210 are formed so as to be arranged along the circumferential direction at each of a plurality of stage positions arranged in a direction along the rotational center axis AX, and the cutting inserts 30 are fixed to the respective chip pockets 210. The number of chip pockets 210 formed at each stage position may be different from the number of cutting inserts 30 at the stage position.

At a given stage position, the number of a plurality of cutting inserts 30 arranged along the circumferential direction (five in the present embodiment) is hereinafter sometimes referred as "number of edges". The number of edges can also be set as the number of the plurality of cutting edges arranged along the circumferential direction. The total number of cutting inserts 30 provided to the cutting part 200 is calculated as "stage position×number of edges". Note that the number of edges may be different among stage positions.

In FIG. 3, the cutting inserts 30 denoted by reference numeral "31" are five cutting inserts 30 arranged along the circumferential direction at a stage position on the farthest leading end side. The cutting inserts 30 denoted by reference numeral "32" are five cutting inserts 30 arranged along the circumferential direction at the second stage position from the leading end side. The cutting inserts 30 denoted by reference numeral "33" are five cutting inserts 30 arranged along the circumferential direction at the third stage position from the leading end side. The cutting inserts 30 denoted by reference numeral "34" are five cutting inserts 30 arranged along the circumferential direction at the fourth stage position from the leading end side, that is, at a stage position on the rearmost end side. The cutting inserts 30 at each stage position are hereinafter sometimes referred to as "cutting inserts 31" and "cutting inserts 32".

A stage position on the most leading end is hereinafter sometimes referred to as "first stage", and the second stage position from the leading end is hereinafter sometimes referred to as "second stage". Similarly, the third stage position from the leading end is hereinafter sometimes referred to as "third stage", and the fourth stage position from the leading end is hereinafter sometimes referred to as "fourth stage".

As illustrated in FIG. 1 and FIG. 3, an outflow port 221 is formed in the inner surface of each chip pocket 210 at a position near the cutting insert 30. The outflow port 221 is an opening provided in order to supply a fluid toward the cutting insert 30. As described later, a channel for guiding fluid supplied from the outside to the outflow port 221 is formed inside the cutting tool 10, and the outflow port 221 is the most downstream end part of the channel.

Note that the above-mentioned "fluid" is supplied from the outside for the purpose of discharging chips, cooling the cutting tool, cooling of workpieces, lubrication, and rust-proofing, and is, for example, called "coolant", and "lubricant". The purpose of supply of fluid is not particularly limited. Fluid may be liquid or gas.

Figure 4:
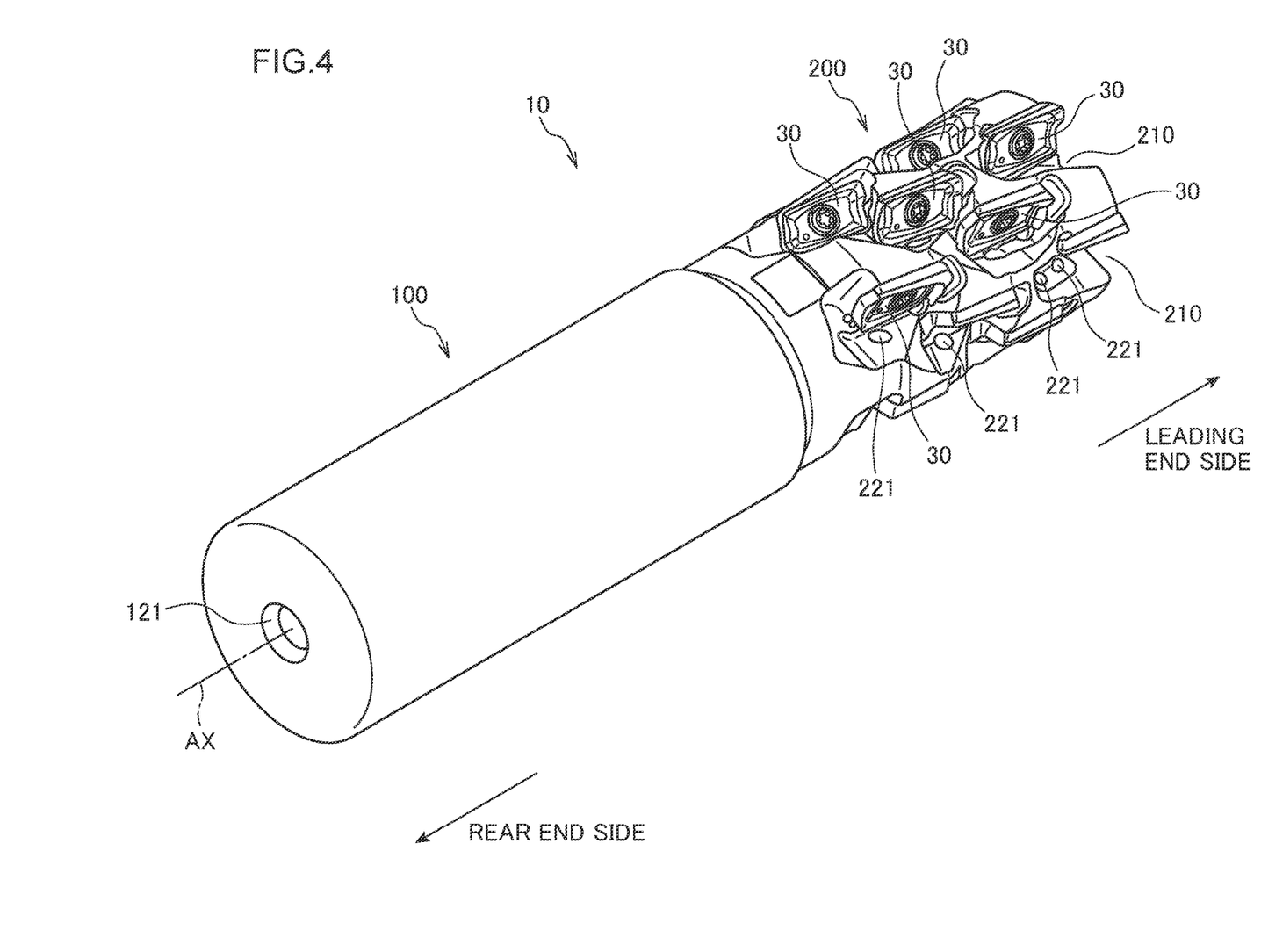
FIG. 4 is a perspective view illustrating the configuration of the cutting tool according to the first embodiment.

As illustrated in FIG. 4, a single inflow port 121 is formed at an end part of the grip part 100 on the opposite side to the cutting part 200, that is, at the rearmost end part. The inflow port 121 is an opening provided as an inlet of the above-mentioned fluid supplied from the outside. In other words, the inflow port 121 is an end part of the above-mentioned channel on the most upstream side. Fluid flows from the inflow port 121 to the channel inside the the cutting tool 10, passes through the channel, and is thereafter discharged from the above-mentioned outflow ports 221 and supplied to the cutting edges of the corresponding cutting inserts 30.

Figure 5:
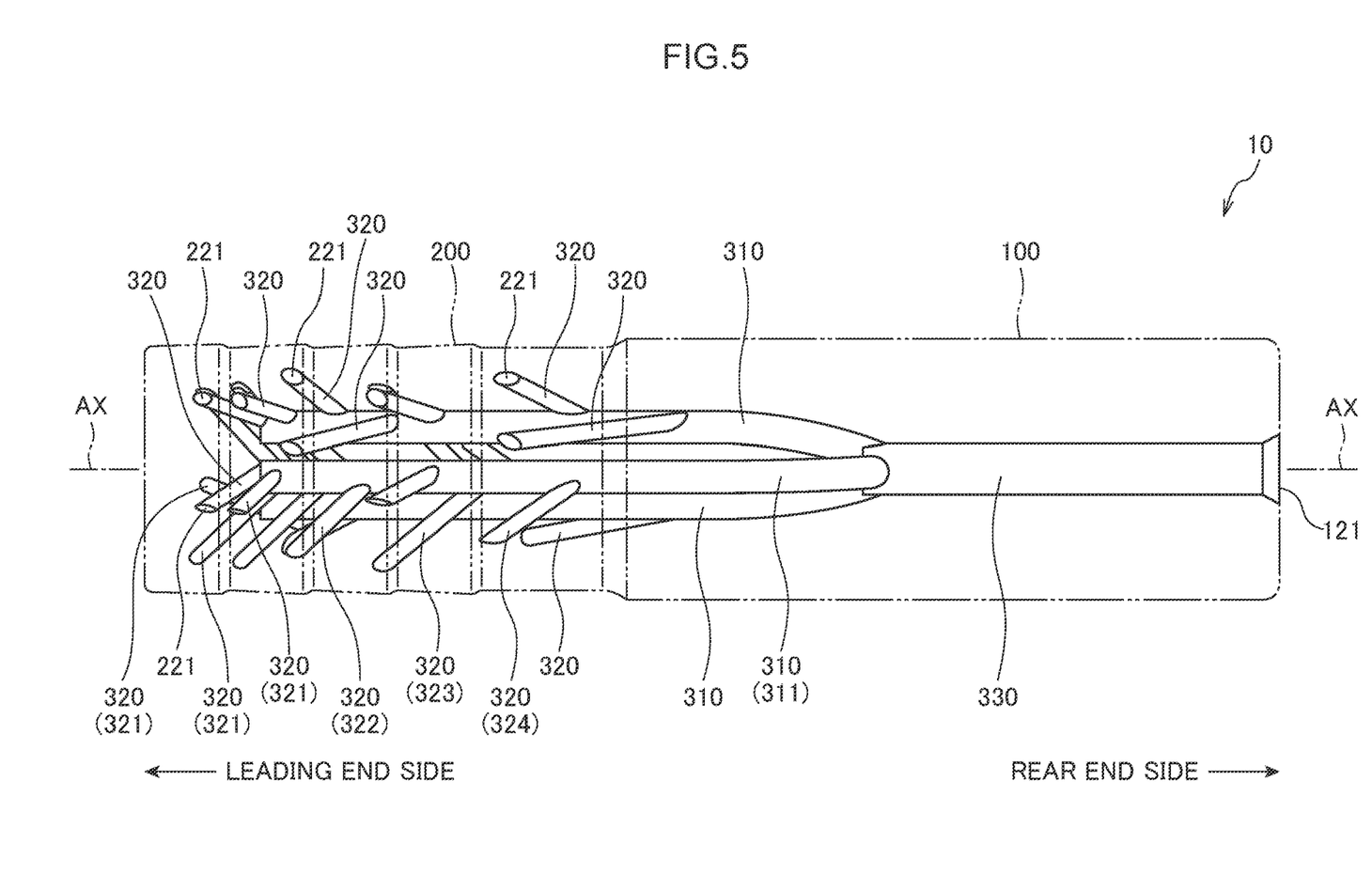
FIG. 5 is a view illustrating a channel formed in the cutting tool according to the first embodiment.
Figure 6:
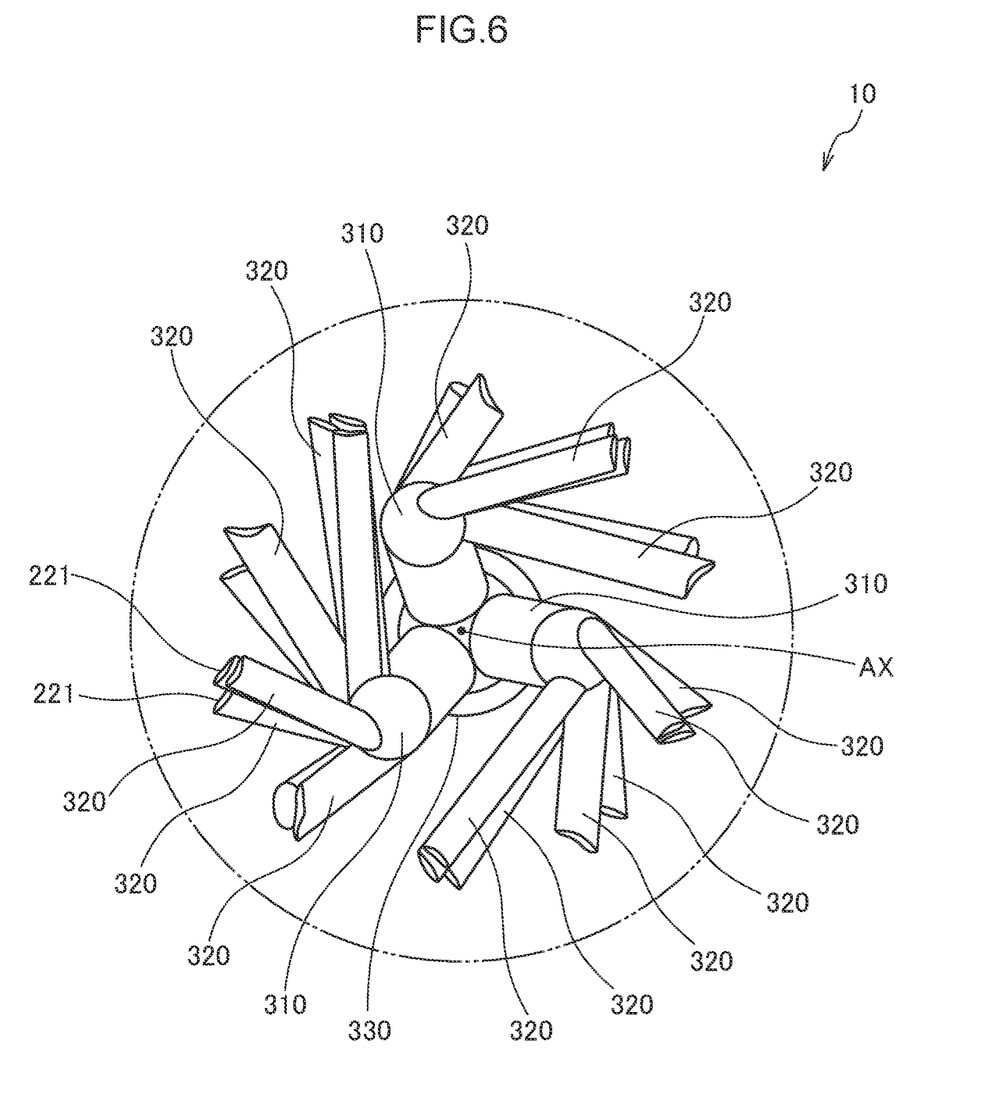
FIG. 6 is a view illustrating a channel formed in the cutting tool according to the first embodiment.

Specific shape of the channels formed inside the cutting tool 10 are described. FIG. 5 is a view illustrating the shapes of the channels formed inside the cutting tool 10 as seen from the same viewpoint as in FIG. 3. FIG. 6 is a view illustrating the shapes of the channels formed inside the cutting tool 10 as seen from the same viewpoint as in FIG. 2. As illustrated in FIG. 5 and FIG. 6, the above-mentioned channels include first channels 310, second channels 320, and a third channel 330.

The third channel 330 is formed to extend in a straight line along the rotational center axis AX from the rear end part of the grip part 100 on the opposite side to the cutting part 200. The center axis of the third channel 330 matches the rotational center axis AX. An opening formed in the end part of the third channel 330 furthest toward the upstream side serves as the inflow port 121 shown in FIG. 4. The third channel 330 extends from the inflow port 121 to a position midway along the grip part 100. An end part of the third channel 330 on the downstream side (the leading end side) is connected to the first channels 310, to be described next.

The first channels 310 are formed so as to branch into three channels from the end part of the third channel 330 and extend further toward the leading end side. Each first channel 310 is formed such that the majority thereof extends in a straight line parallel to the rotational center axis AX. Note, however, that a part of the first channel 310 on the rear end side curves toward the central third channel 330. The first channels 310 extend to a position near the end part of the cutting part 200 on the leading end side. Note that in a case where the inner diameter of the third channel 330 is sufficiently large or the like, for example, the first channels 310 may be formed so as to extend entirely in a straight line parallel to the rotational center axis AX.

As shown in FIG. 6, the first channels 310 are respectively formed in eccentric positions so that the central axes of the rectilinear parts thereof do not match the rotational center axis AX, and are formed to surround the periphery of the rotational center axis AX at equal angular intervals. More specifically, in this embodiment, the three first channels 310 are provided in positions that differ from each other by 120 degrees along the circumferential direction. One or two outflow ports 221 are formed in the inner surface of each chip pocket 210, and the second channels 320 are respectively formed to extend from the outflow ports 221 toward one of the first channels 310.

The second channels 320 are respectively formed to extend in a straight line toward the cutting inserts 30 from positions midway on the first channels 310. Downstream-side end parts of the respective second channels 320 form the outflow ports 221 described above, i.e., openings formed in the inner surfaces of the chip pockets 210.

In this embodiment, the first channels 310, the second channels 320, and the third channel 330 are all formed as channels having a circular cross-section. The inner diameter of the first channel 310 is larger than the inner diameter of the second channel 320, and the inner diameter of the third channel 330 is larger than the inner diameter of the first channel 310. In other words, the inner diameter of the channel formed in the interior of the cutting tool 10 decreases in steps from the upstream side toward the downstream side in order of the third channel 330, the first channels 310, and the second channels 320.

A main body portion of the cutting tool 10 having the first channels 310, second channels 320, and third channel 330 shaped as described above can be manufactured using a 3D printer, for example. The respective channels may have different shapes to those described above. For example, the second channels 320 may be formed as partially or entirely curved channels.

In FIG. 5, the second channel 320 denoted by reference numeral "321" is a second channel 320 formed so as to extend toward the cutting inserts 31 at the first stage. In FIG. 5, the second channel 320 denoted by reference numeral "322" is a second channel 320 formed so as to extend toward the cutting insert 32 at the second stage. In FIG. 5, the second channels 320 denoted by reference numeral "323" is a second channel 320 formed so as to extend toward the cutting insert 33 at the third stage. In FIG. 5, the second channel 320 denoted by reference numeral "324" is a second channel 320 formed so as to extend toward the cutting insert 34 at the fourth stage. These second channels 320 are connected to the common first channel 310 (first channel 310 denoted by reference numeral "311" in FIG. 5). Regarding the other first channels 310, second channels 320 directed to the cutting inserts 30 at each stage portion are connected similarly to the above.

As described above, in the cutting tool 10 according to the present embodiment, a plurality of second channels 320 are connected to one first channel 310 such that fluid that has passed through the one first channel 310 is supplied to each of the cutting inserts 30 located at a plurality of stage positions. In such a configuration, the number of first channels 310 is not required to be increased in accordance with the number of stage positions, and hence the inner diameter of the first channel 310 can be sufficiently secured to reduce the channel resistance in the first channel 310.

Note that, in the cutting tool 10 according to this embodiment, two second channels 320 are directed to each of the cutting inserts 31 at the first stage, and one second channel 320 is directed to each of the cutting inserts 32 at the second and subsequent stages. The reason why the number of second channels 320 directed to the cutting inserts 31 at the first stage is increased is that the fact that the processing load on the cutting inserts 31 at the first stage is larger than the processing load on other cutting inserts 32 is taken into consideration. The number of second channels 320 directed to the cutting inserts 30 at each stage position may be changed as appropriate.

Figure 7:
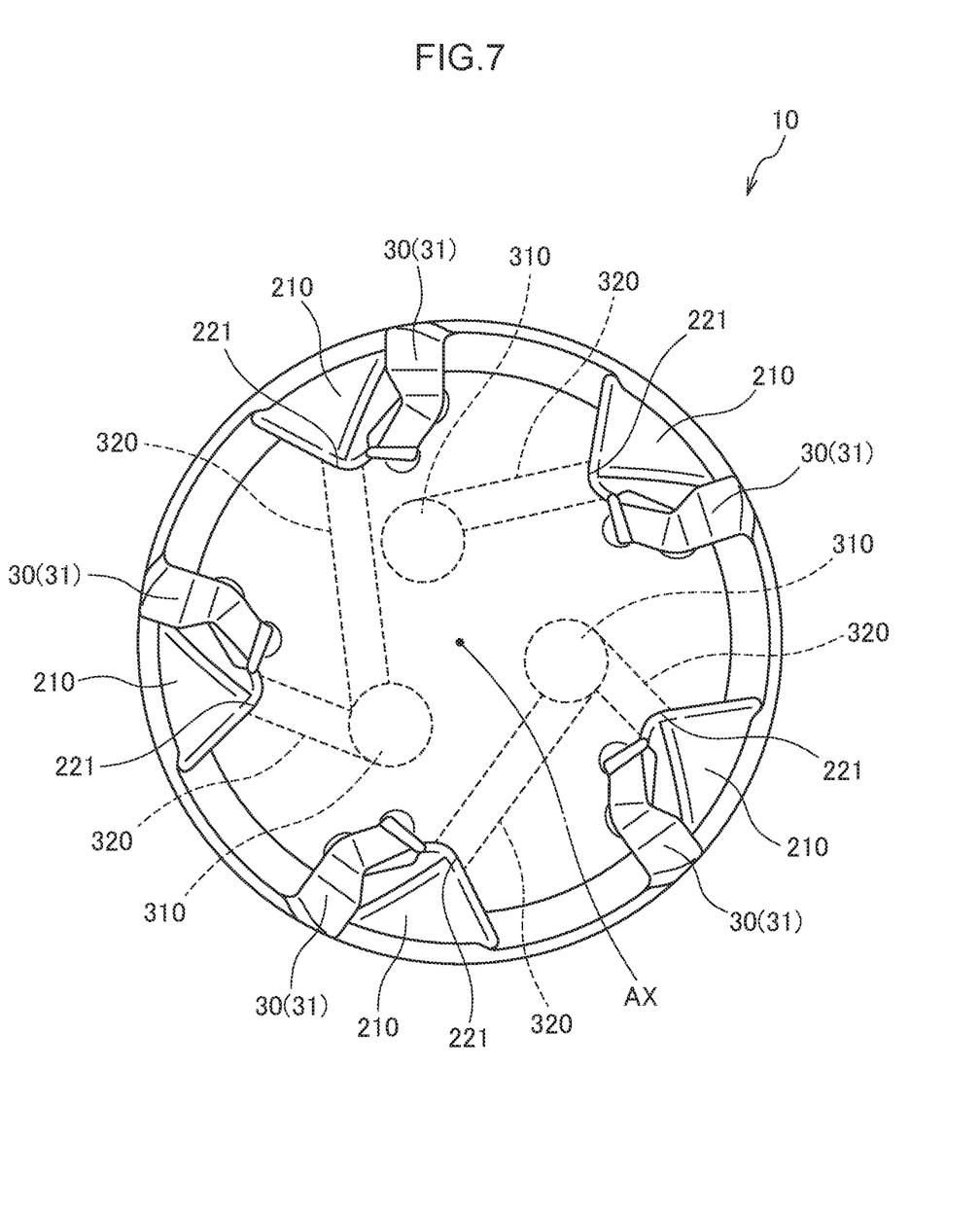
FIG. 7 is a view illustrating the configuration of the cutting tool according to the first embodiment.

FIG. 7 is a view of the cutting part 200 as seen from the leading end side along the rotational center axis AX similarly to FIG. 2. FIG. 7 illustrates the first channels 310 and the second channels 320 directed to the cutting inserts 31 at the first stage. The illustration of the other second channels 320 and the third channel 330 are omitted. FIG. 7 schematically illustrates a part of the inner surface of the chip pocket 210 in a simple manner. As illustrated in FIG. 7, when five cutting inserts 31 located at a stage position on the most leading end side are focused, the second channels 320 are formed such that fluid is supplied from one first channel 310 toward one or two cutting inserts 31. In other words, a plurality of second channels 320 are connected to one first channel 310 such that fluid that has passed through one first channel 310 is supplied to each of a plurality of cutting inserts 31.

Thus, although the number of first channels 310 (three) is smaller than the number of cutting inserts 31 arranged along the circumferential direction at the same stage position, that is, the number of edges (five), fluid can be supplied toward all cutting inserts 31. The same applies to the cutting inserts 32 located at the other stage positions.

In such a configuration, as compared with the case where the same number of first channels 310 as the number of the 'number of edges' is provided, the inner diameter of the first channel 310 can be increased to reduce the channel resistance in the first channel 310.

In this embodiment, as described above, the number of first channels 310 is smaller than the number of cutting inserts 31 arranged along the circumferential direction at each stage position (in other words, the number of cutting edges arranged at each position), and as a result, the channel resistance of the channel as a whole is reduced. Furthermore, in this embodiment, the third channel 330, which has an even larger inner diameter, is formed on the upstream side of the first channels 310, and therefore the channel resistance of the channel as a whole is further reduced. According to this configuration, a sufficient amount of fluid can be supplied to the cutting edges of the respective cutting inserts 30.

Figure 8:
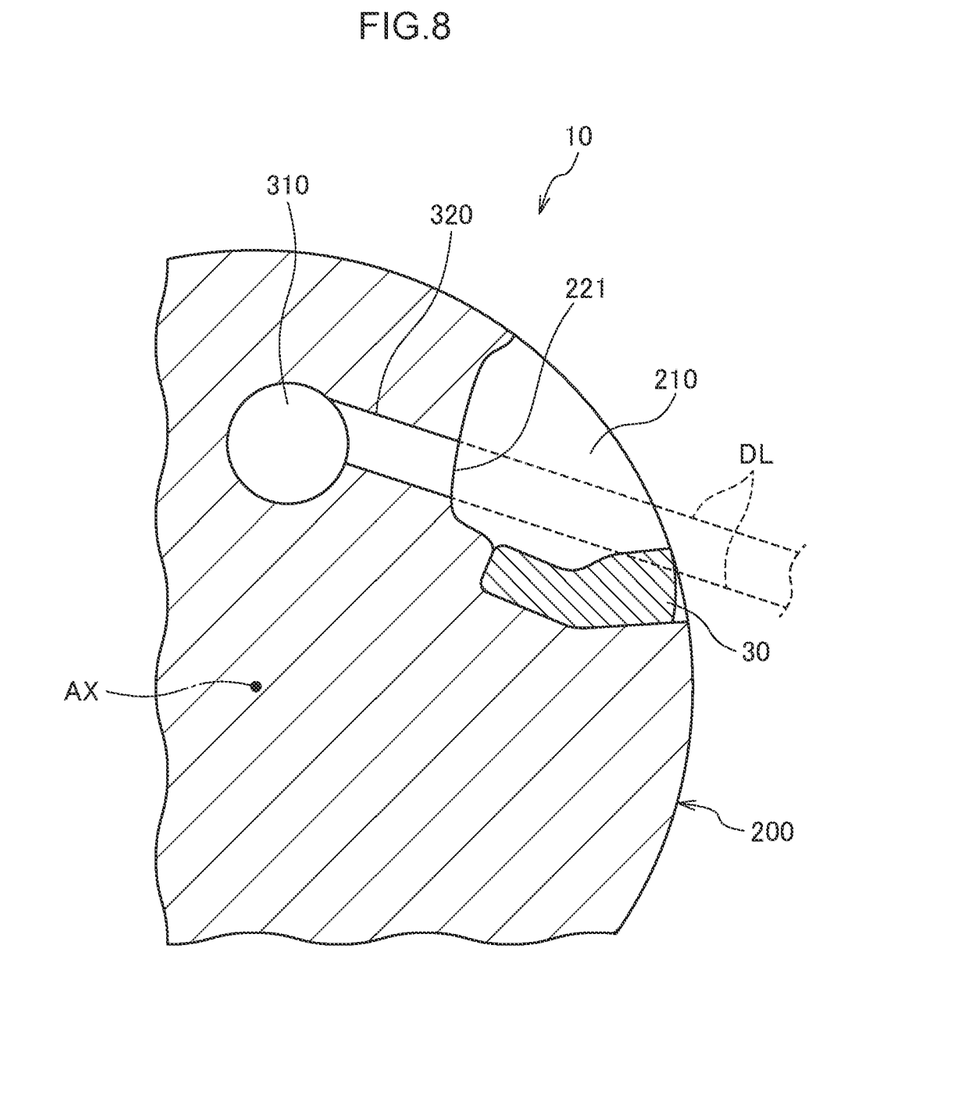
FIG. 8 is a view illustrating the configuration of the cutting tool according to the first embodiment.

FIG. 8 schematically a part of a cross-section of the cutting part 200 cut perpendicularly to the rotational center axis AX. Dotted lines DL illustrated in FIG. 8 indicate an outward extension of a direction in which the second channel 320 linearly extends, and indicate a direction in which fluid that has passed through the second channel 320 is ejected from the outflow port 221. As illustrated in the figure, it is preferred that the second channel 320 be formed in such a direction that a part of the cutting insert 30 enters the inner side of the range indicated by the dotted lines DL. In other words, it is preferred that the second channel 320 be formed in such a direction that at least at a part of ejected fluid directly contacts a part of the cutting insert 30. It is further preferred that "a part of the cutting insert 30" be a part of the cutting edge of the cutting insert 30.

Figure 9:
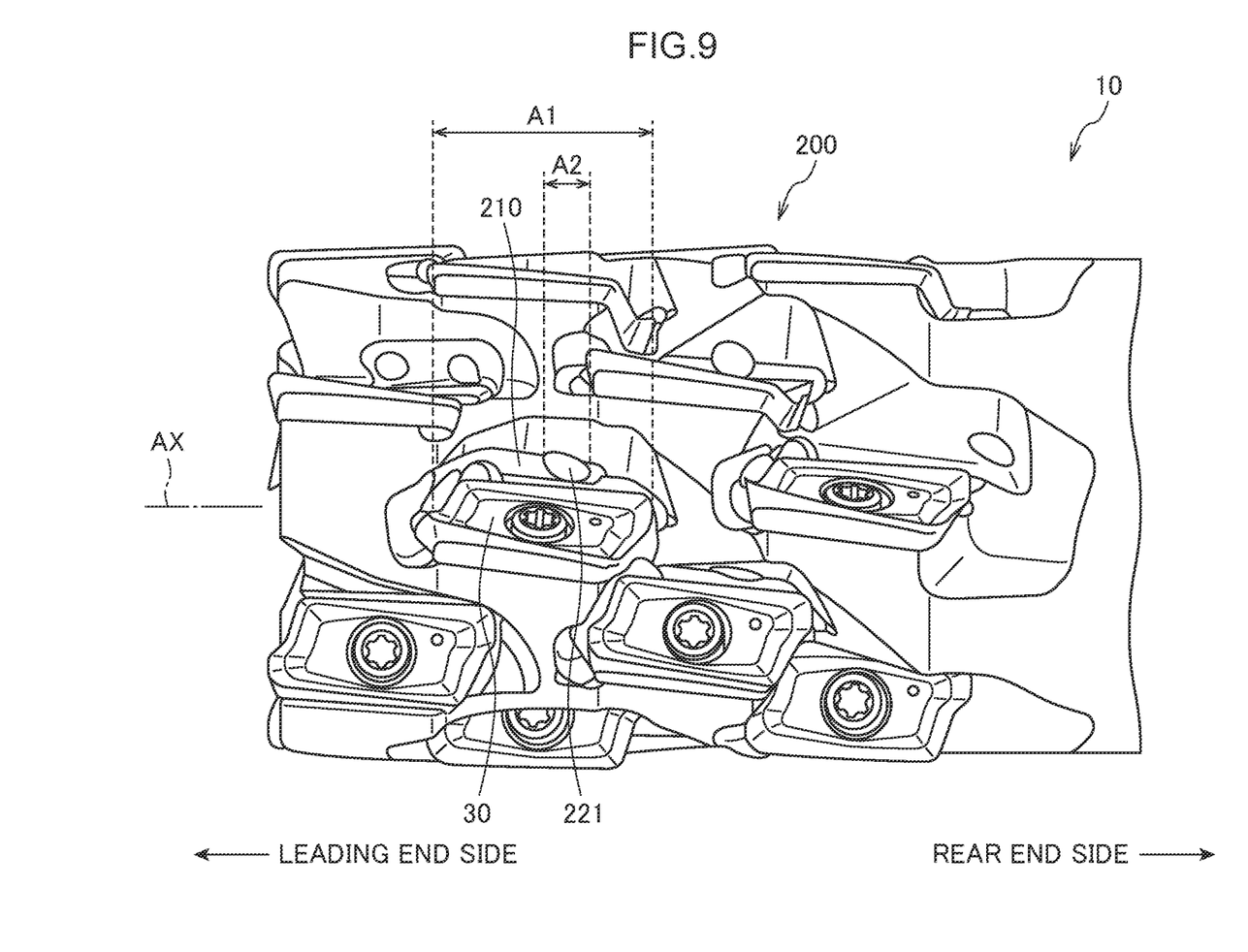
FIG. 9 is a view describing a positional relationship between an outflow port and a cutting insert in the cutting tool according to the first embodiment.

FIG. 9 is an enlarged view showing the cutting part 200 in FIG. 3. Description is now given focusing on the cutting insert 30 denoted by reference numeral "30" and the outflow port 221 denoted by reference numeral "221" in FIG. 9. The cutting insert 30 and the outflow port 221 are provided at the same chip pocket 210.

A range A1 shown in FIG. 9 indicates a range where the cutting insert 30 is provided in a direction along the rotational center axis AX. A range A2 illustrated in FIG. 9 indicates a range where the outflow port 221 is formed in a direction along the rotational center axis AX. In the present embodiment, the entire range A2 is included in the range A1. In other words, the position of the outflow port 221 in the direction along the rotational center axis AX is a position overlapping the range A1 where the cutting insert 30 is provided in that direction.

If the outflow port 221 is provided at a position on a rear end side of the range A1 where the cutting insert 30 is provided, the fluid is ejected from the outflow port 221 in a state in which components of velocity toward the leading end are large, and is supplied toward the cutting insert 30 on the leading end side. In this case, the direction in which fluid flows and the direction in which chips are discharged are opposite to each other, and hence the discharge of chips is blocked by the flow of fluid, and jamming due to chips may occur.

In this embodiment, on the other hand, the outflow port 221 is provided at a position overlapping the range A1 as described above, and hence fluid is ejected from the outflow port 221 in the state in which velocity components toward the leading end are small, and is supplied toward the cutting insert 30 on the leading end side. Thus, a phenomenon that the discharge of chips is blocked by the flow of fluid is difficult to occur. Note that the outflow port 221 may be formed at such a position that the entire outflow port 221 is included inside the range A1 as in the embodiment. Alternatively, the outflow port 221 may be formed at such a position that only a part of the outflow port 221 is located inside the range A1.

The same positional relation between the outflow port 221 and the cutting insert 30 is applied to all other outflow ports 221.

A second embodiment is described. In the following, differences from the first embodiment are mainly described, and descriptions of parts common to the first embodiment are omitted as appropriate.

Figure 10:
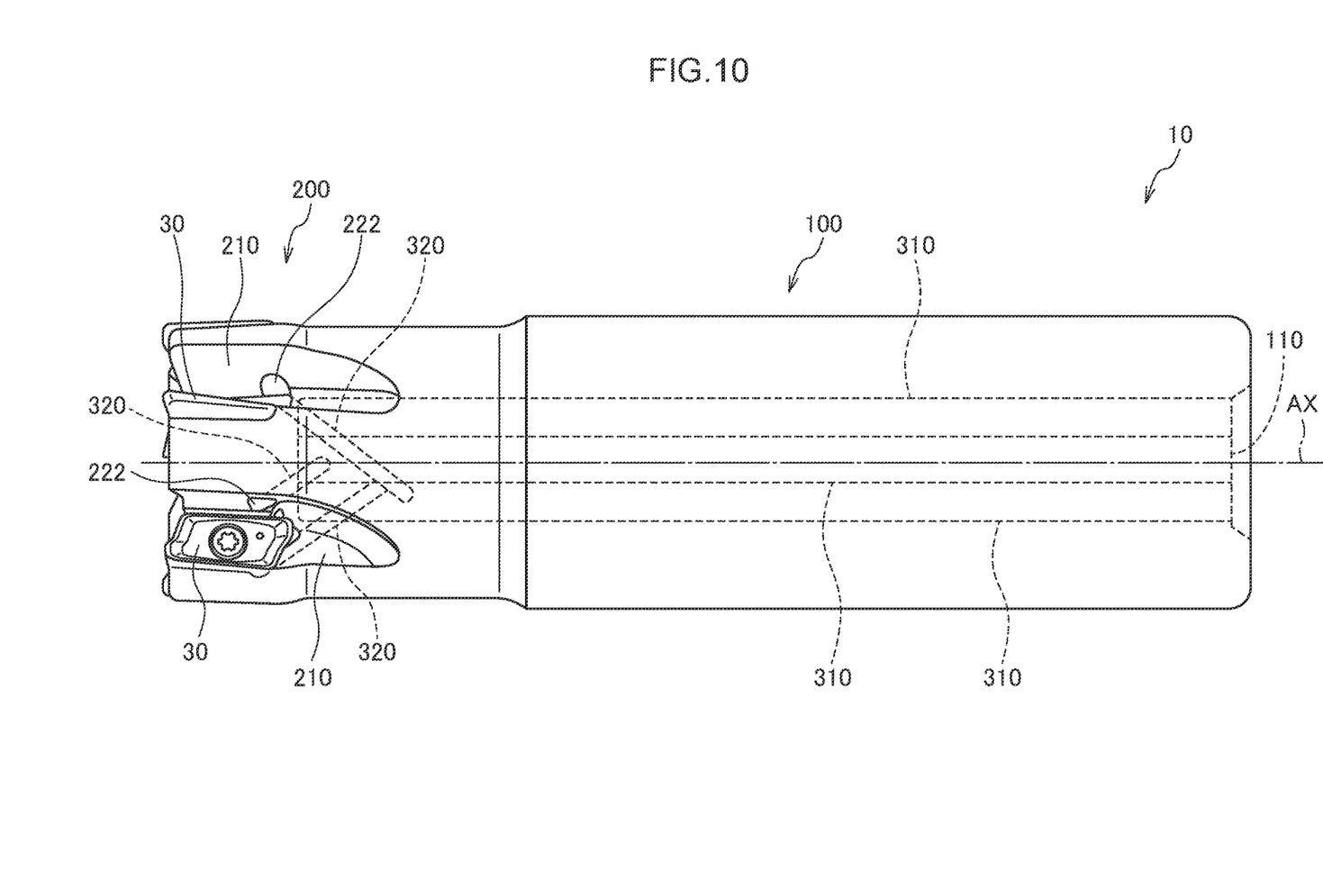
FIG. 10 is a view illustrating a configuration of a cutting tool according to a second embodiment.

FIG. 10 illustrates the appearance of the cutting tool 10 according to the present embodiment from the same viewpoint as in FIG. 3. As illustrated in FIG. 10, the cutting tool 10 according to the present embodiment is configured as an endmill of precision machining type in which the cutting inserts 30 are provided only at the first stage on the leading end side.

Likewise in this embodiment, similarly to the first embodiment, the first channels 310 and the second channels 320 are formed in the interior of the cutting tool 10. In this embodiment, however, the third channel 330 is not formed, and the three first channels 310 extend in a straight line to the rear end part of the grip part 100 on the opposite side to the cutting part 200. An aspect in which the third channel 330 is formed, similarly to the first embodiment, may be employed instead of this aspect. Likewise in this embodiment, similarly to the first embodiment, the second channels 320 are formed so as to extend in a straight line from the first channels 310 toward the cutting edges of the cutting inserts 30.

The configuration of the first channels 310 described in the first embodiment is also applicable to various cutting tools other than roughing type cutting tools, and the same effects as in the first embodiment can be achieved.

Incidentally, machine tools capable of supplying fluid to channels inside the cutting tool are configured such that fluid is supplied from the center of the cutting tool in many cases. Thus, when the first channels 310 extending to the rear end part are formed at a position decentered from the rotational center axis AX as in the present embodiment, the position at which fluid is supplied from the machine tool and the position of the inflow port 121 serving as the inlet into the first channels 310 do not match each other, and hence there is a fear in that fluid does not smoothly flow into the inflow port 121.

Hence, in this embodiment, a single recessed part 110 is formed in the end part of the grip part 100 furthest toward the rear end side so as to recede toward the cutting part 200 side. Further, the inflow ports 121 serving as the inlets into the first channels 310 are formed in positions inside the recessed part 110.

In such a configuration, fluid supplied from a machine tool along the rotational center axis AX first flows to the inside of the recessed part 110, subsequently passes through the corresponding inflow port 121, and is distributed to the first channels 310 smoothly. Thus, the above-mentioned problem caused by the configuration in which the first channel 310 is formed at a decentered position does not occur.

The range where the recessed part 110 is formed only needs to be a range that includes the rotational center axis AX at least on its inner side. The entire inflow port 121 may be formed in a range overlapping the recessed part 110, but the inflow port 121 may be formed at a position at which only a part of the inflow port 121 overlaps the recessed part 110. Furthermore, the inflow port 121 that is formed in a range where the entire inflow port 121 overlaps the recessed part 110 and the inflow port 121 that is formed at a position at which only a part of the inflow port 121 overlaps the recessed part 110 may be mixed.

In the above, an example of the configuration in which the cutting edge of the cutting tool 10 is provided to the cutting insert 30 such that the cutting edge is replaceable has been described. However, for example, the configuration of the channels described above is also applicable to a cutting tool configured such that a cutting edge is brazed to the cutting tool 10 and the cutting edge is unreplaceable.

The embodiments have been described above with reference to specific examples. However, the present disclosure is not limited to the specific examples. Design changes appropriately added to the specific examples by a person skilled in the art are included in the scope of the present disclosure as long as the features of the present disclosure are included. The components in each of the above-mentioned specific examples, the arrangement, conditions, and shapes thereof are not limited to the exemplified ones, and can be changed as appropriate. The combinations of the components in each of the above-mentioned specific examples can be changed as appropriate unless technical conflict occurs.

What is claimed is:

1. A cutting tool, comprising:
   a columnar grip part defining a rotational center axis of the cutting tool;
   a cutting part comprising:
   a plurality of stage positions along the rotational center axis, each of the plurality of stage positions having:
   a plurality of recessed chip pockets, and
   a plurality of cutting inserts, each cutting insert disposed on a respective one of the plurality of recessed chip pockets, wherein the plurality of cutting inserts are arranged along a circumferential direction,
   a channel system comprising:
   an inflow port formed in the grip part,
   a plurality of first channels extending at least partially parallel to the rotational center axis, along the grip part and the cutting part, and
   a plurality of second channels extending from at least one of the first channels toward the plurality of cutting inserts, wherein each of the second channels includes an outflow port formed in a vicinity of a respective one of the plurality of cutting inserts, and
   a number of first channels is smaller than a number of the plurality of cutting inserts arranged along the circumferential direction at one of the plurality of stage positions along the rotational center axis.

2. The cutting tool according to claim 1, wherein the plurality of second channels are connected to the at least one first channel such that fluid is passed through the at least one first channel and supplied to the plurality of cutting inserts.

3. The cutting tool according to claim 1, wherein, in the cutting part, the plurality of the cutting inserts are provided respectively at a plurality of the stage positions arranged in a direction along the rotational center axis so as to be arranged along the circumferential direction.

4. The cutting tool according to claim 3, wherein the plurality of second channels are connected to the at least one first channel such that fluid is passed through the at least one first channel and supplied toward the plurality of cutting inserts located at the plurality of the stage positions.

5. The cutting tool according to claim 1, wherein the channel system further includes a third channel that extends along the rotational center axis from an end part of the grip part on an opposite side to the cutting part, and
   the plurality of first channels are connected to the third channel.

6. The cutting tool according to claim 5, wherein inner diameters of the plurality of first channels are larger than inner diameters of the plurality of second channels, and an inner diameter of the third channel is larger than the inner diameters of the plurality of second channels.

7. The cutting tool according to claim 1, wherein
   each outflow port is an outlet for fluid passed through a respective second channel, each outflow port is formed in an inner surface of a respective recessed chip pocket, and
   a respective position of each outflow port in a direction along the rotational center axis is located within a range where a respective cutting insert is provided in the direction along the rotational center axis.

* * * * *